(12) United States Patent
Barfoot et al.

(10) Patent No.: US 11,953,294 B1
(45) Date of Patent: Apr. 9, 2024

(54) SYSTEM AND METHOD FOR ACTIVE PROTECTION SYSTEM RANGE ESTIMATION

(71) Applicant: BAE Systems Information and Electronic Systems Information Inc., Nashua, NH (US)

(72) Inventors: David A. Barfoot, Austin, TX (US); Mark A. Frank, Austin, TX (US); David L. Oles, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 323 days.

(21) Appl. No.: 17/462,189

(22) Filed: Aug. 31, 2021

(51) Int. Cl.
| G06N 20/00 | (2019.01) |
| F41H 11/02 | (2006.01) |
| F41H 13/00 | (2006.01) |
| G01C 21/16 | (2006.01) |

(52) U.S. Cl.
CPC ......... *F41H 11/02* (2013.01); *F41H 13/0056* (2013.01); *G01C 21/16* (2013.01)

(58) Field of Classification Search
CPC .. F41H 11/02; F41H 13/0056; F41H 13/0075; G01C 21/16; G06N 20/00
See application file for complete search history.

(56) References Cited

U.S. PATENT DOCUMENTS

| 10,907,940 B1* | 2/2021 | Parker .................... G06N 20/00 |
| 2018/0158305 A1* | 6/2018 | Noland .............. G08B 21/0438 |

\* cited by examiner

*Primary Examiner* — David E Smith
*Assistant Examiner* — Hsien C Tsai
(74) *Attorney, Agent, or Firm* — Sand, Sebolt & Wernow LPA; Gary McFaline

(57) ABSTRACT

A system and methods of an active protection system (or "APS") for a platform. The APS has a threat cueing sensor provided at a first position on the platform where the threat cueing sensor detects a threat launched from a threat guidance system at a distance away from the platform. The APS also has a logic system operably connected to the threat cueing sensor where the logic system is adapted to determine an estimated location of the threat guidance system via a distance away from the platform. The APS also has a laser source operably connected to the logic system where the laser source emits a countermeasure beam directed at the estimated location of the threat guidance system to deter the threat away from the platform.

16 Claims, 13 Drawing Sheets

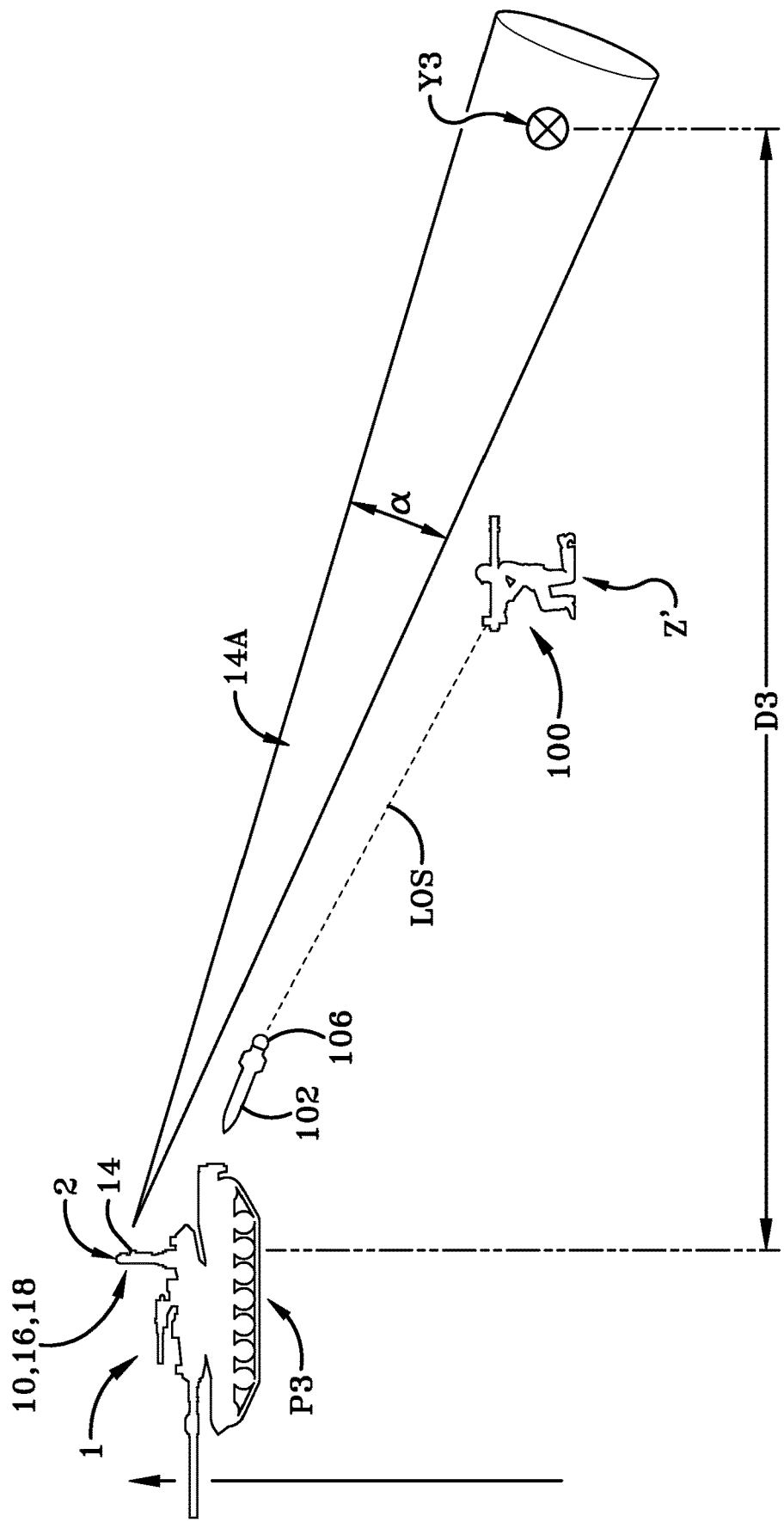

SYSTEM AND METHOD FOR ACTIVE PROTECTION SYSTEM RANGE ESTIMATION

STATEMENT OF GOVERNMENT INTEREST

This invention was made with government support under Contract No. DCS-S-19-023 awarded by the Ground Vehicle Systems Center of the United States Army. The government has certain rights in the invention.

TECHNICAL FIELD

The present disclosure generally relates to a system for diverting a missile fired at an area that is to be protected, either military or commercial. More specifically, the present disclosure relates to a system for diverting a missile fired at a ground vehicle. Specifically, the present disclosure relates to a system that includes countermeasure devices, such as electromagnetic devices, for diverting a missile fired at a ground vehicle or other platforms.

BACKGROUND

Active protection systems (or "APS" hereinafter) may be used on a military platform for providing platform protection during a military operation. Such APSs may be used on different types of military platforms such as vehicles (ground vehicles, air vehicles, or naval vehicles), structures, or other suitable military platforms for an APS. Generally, an APS uses a "soft-kill" tactic in deterring and neutralizing incoming enemy threats, such as anti-tank guided missiles (or "ATGM" hereinafter). One common ATGM that an APS generally encounters during a military operation is a semi-automatic command to line-of-sight device (or "SACLOS" hereinafter). In order to deter and neutralize this type of ATGM, the APS may locate the SACLOS, via a threat cueing sensor, provided on the military platform. The APS then neutralizes the enemy threat from a launcher of the SACLOS by directing an electromagnetic beam at the launcher to inhibit and/or jam the line-of-sight between the enemy threat and the launcher of the SACLOS. However, if the APS is provided on a moving military platform, such as a military ground vehicle, the pointing accuracy of the electromagnetic beam is compromised when the range of the SACLOS is not known.

In order to locate and neutralize an enemy threat from a SACLOS, current APSs generally use complex techniques such as optical augmentation or other rangefinder techniques to provide range information. However, these types of techniques and devices are rather undesirable due to significant add-on costs to a military platform. In addition, these types of techniques and devices are rather undesirable due to complexity added to an APS when provided on a military platform.

SUMMARY

The presently disclosed APS provides a military platform with the capability of locating and neutralizing an enemy threat, such as a SACLOS, through a dynamic range estimation method that maximizes dwell time of the countermeasure beam on the threat while the military platform is rotating and/or translating away from threat. The disclosed APS provides a soft-kill APS that removes the costs of complex hardware on the military platform that would be needed to provide range information to the APS. The disclosed APS may also provide additional devices at a low cost that can be optionally utilized in conjunction with the dynamic range estimation method to further improve the dwell time and the APS performance during a military operation. As such, the APS disclosed herein addresses some of the inadequacies and detriments of previously known soft-kill APSs provided on military platforms.

In one aspect, an exemplary embodiment of the present disclosure may provide an active protection system for a platform. The active protection system includes a threat cueing sensor that is provided at a first position on the platform, wherein the threat cueing sensor detects a threat launched from a threat guidance system at a distance away from the platform. The active protection system also includes a logic system that is operably connected to the threat cueing sensor, wherein the logic system is adapted to determine an estimated location of the threat guidance system via a distance away from the platform. The active protection system also includes a laser source that is provided at a second position on the platform and is operably connected to the logic system, wherein the laser source emits a countermeasure beam directed at the estimated location of the threat guidance system to deter the threat away from the platform.

This exemplary embodiment or another exemplary embodiment may further provide that the threat cueing sensor is adapted to analyze a bearing vector of the threat when launched from the threat guidance system relative to the platform to provide a bearing of the threat guidance system. This exemplary embodiment or another exemplary embodiment may further provide that the countermeasure beam is adapted to be directed at an optical sight of the threat guidance system to impair the ability of tracking the threat from said threat guidance system. This exemplary embodiment or another exemplary embodiment may further provide that the threat cueing sensor is an ultraviolet-visible-infrared camera. This exemplary embodiment or another exemplary embodiment may further provide an inertial navigation system operably connected to the logic system, the inertial navigation system is adapted to provide substantially instantaneous feedback of the rotation and the translation of the platform from an initial position to a translated position. This exemplary embodiment or another exemplary embodiment may further provide that the logic system sets a predetermined point located between the platform and the threat guidance system when the platform is provided at the initial position. This exemplary embodiment or another exemplary embodiment may further provide that the logic system dynamically estimates the estimated location of the threat guidance system from the predetermined point when the platform rotations or translates from the initial position to the translated position. This exemplary embodiment or another exemplary embodiment may further provide that the laser source further comprises a beam divergence defined by the countermeasure beam, wherein the beam divergence defines an angular range measurement between about 1 degree to about 5 degrees. This exemplary embodiment or another exemplary embodiment may further provide at least one acoustic sensor operably connected to the logic system, wherein the at least one acoustic sensor is adapted to analyze the acoustic pressure wave emitted from a threat when launched from the threat guidance system. This exemplary embodiment or another exemplary embodiment may further provide that at least one temperature sensor operably connected to the logic system, wherein the at least one temperature sensor is adapted to analyze the temperature changes due to the speed of sound of a threat launched from the threat guidance system.

In another aspect, an exemplary embodiment of the present disclosure may provide a method of diverting a threat away from a platform. The method comprises the steps of initiating an active protection system on the platform; detecting an initial launch of a threat from a threat guidance system via a threat cueing sensor; sending a first signal, via the threat cueing sensor, to a logic system provided on the platform based on the initial launch of the threat; adjusting a laser source, via the logic system, to a predetermined location of the initial launch of the threat from the threat guidance system; emitting a countermeasure beam, via a laser source, at the predetermined location relative to the initial launch; impairing the tracking of the threat from the threat guidance system, via the laser source; and controlling the threat away from the platform to neutralize the threat.

This exemplary embodiment or another exemplary embodiment may further provide the steps of analyzing the bearing vector of the threat, via the threat cueing sensor, when the threat is launched from the threat guidance system relative to the platform; and determining the bearing of the threat guidance system, via the threat cueing sensor, based on the bearing vector of the threat. This exemplary embodiment or another exemplary embodiment may further provide the step of directing at an optical sight of the threat guidance system to impair to ability of tracking the threat from said threat guidance system. This exemplary embodiment or another exemplary embodiment may further provide the step of directing the countermeasure beam at a predetermined location, via the logic system, at a distance between the platform and the threat guidance system. This exemplary embodiment or another exemplary embodiment may further provide the step of adjusting the countermeasure beam, via an inertial navigation system, based on rotation or translation of the platform from an initial position to a translated position. This exemplary embodiment or another exemplary embodiment may further provide the step of dynamically estimating the actual location of the threat guidance system, via the logic system, when the platform moves orthogonally from the initial position to the translated position relative to the threat guidance system. This exemplary embodiment or another exemplary embodiment may further provide the step of correcting the countermeasure beam, via the logic system, from the predetermined location towards the estimated location of the threat guidance system when the platform moves orthogonally from the initial position to the translated position relative to the threat guidance system. This exemplary embodiment or another exemplary embodiment may further provide the step of analyzing the acoustic pressure wave emitted from a threat when launched from the threat guidance system via at least one acoustic sensor. This exemplary embodiment or another exemplary embodiment may further provide the step of analyzing the temperature changes due to the speed of sound of a threat launched from the threat guidance system via at least one temperature sensor.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 4C (FIG. 4C) is a diagrammatic view similar to FIG. 4B, but the dynamic range estimation method, via the logic system, dynamically estimates the range of the threat guidance system from the first translated location to a second translated location.

Similar numbers refer to similar parts throughout the drawings.

DETAILED DESCRIPTION

Figure 1A:
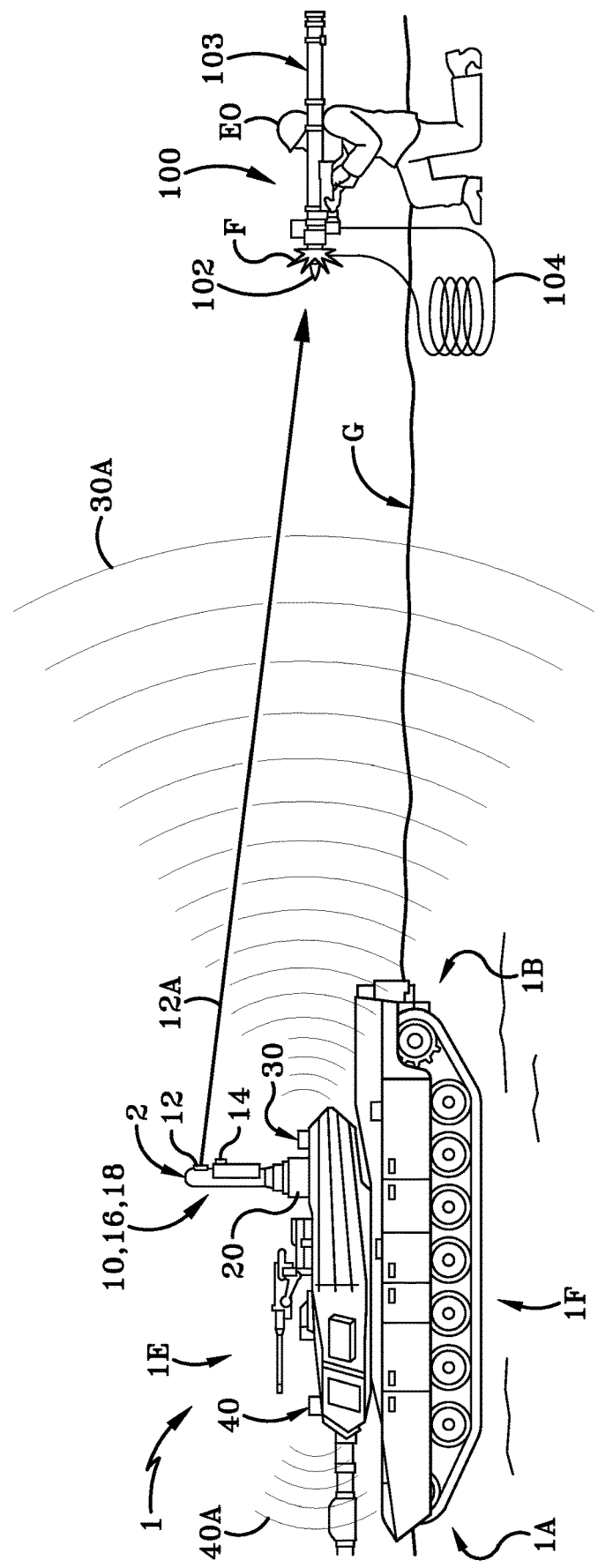
FIG. 1A (FIG. 1A) is a diagrammatic view showing an ADS provided on a platform during a military operation, wherein a threat cueing sensor detects the launching of a missile threat from a threat guidance system, and wherein at least one acoustic sensor and at least one temperature sensor is being enabled during a military operation.

FIG. 1 illustrates a military platform, a military ground vehicle, an armored military vehicle, which will be generally referred herein as a "platform" or a "ground vehicle." The platform vehicle is indicated generally by the reference number 1. It will be understood that that illustrated platform 1 is exemplary only and any type of platform, military platform, or mobile platform is contemplated to be represented by the illustrated platform. Other types of platforms or ground vehicles that are represented by platform 1 may include light utility vehicles, light armored utility vehicles, armored combat support vehicles, armored personnel carrier vehicles, infantry fighting vehicles, main battle tank vehicles, or any other suitable type of platforms. In addition, the platform 1 may be a platform is capable of moving or a platform that remains stationary.

The platform 1 includes a front end 1A, an opposed rear end 1B, and a longitudinal direction that is directed from the rear end 1B to the front end 1A. The platform 1 also includes a top end 1E, an opposed bottom end 1F, and a vertical direction that is directed from the bottom end 1F to the top end 1E. The platform 1 also includes a mast 2 that is disposed proximate to the rear end 1B of the platform 1. Generally, the mast 2 is a cylindrical member that extends from the platform 1 and towards the top end 1E of the platform 1. The mast 2 is disposed at a suitable elevation and/or height on the platform 1 in which the platform 1 will not be impeded or blocked by any devices and/or components provided on the platform 1 during a military operation. As described in detail later herein, the mast 2 may be rotatable on the platform 1 relative to the vertical direction of the platform 1 during a military operation.

As illustrated in FIG. 1, the platform 1 is provided with an active protection system 10 (or "APS") positioned inside of the mast 2. The APS 10 described and illustrated herein is a "soft-kill APS" operable with the platform 1 to greatly improve the deterrence and jamming of potential incoming missile threats to the platform 1 during a military operation. Such incoming missile threats that may be deterred and/or jammed through countermeasure tactic of the APS 10 may be anti-tank guided missiles (or "ATGMs"), such as semi-automatic command to line-of-sight "LOS" (or "SACLOS") missiles. Such deterring and/or jamming of missile threats from a stationary threat guidance system is described in more detail below. In addition, the APS 10 may include a threat cueing sensor 12, a laser source 14, an inertial navigation system 16 (or "INS"), and a processor and/or logic system 18 operably connected to the threat cueing sensor 12, the laser source 14, and the INS 16.

In addition, each of the threat cueing sensor 12 and the laser source 14 may be moveable and/or rotatable via an adjustment mechanism 20 provided in the mast 2 for continuously adjusting the APS 10 during a military operation. Such continuous adjustment of the threat cueing sensor 12 and the laser source 14 via the adjustment mechanism 20 is described in more detail below. Moreover, the APS 10 may be electrically connected to an on-board electrical system of the platform 1 for powering and operating the APS 10 during a military operation. Furthermore, the APS 10 may be operably connected to an on-board countermeasure system of the platform 1 that may control and/or operate the APS 10 during a military operation.

Referring to FIG. 1A, the threat cueing sensor 12 may be provided at a first position on the mast 2. During a military operation, the threat cueing sensor 12 of the APS 10 may be used to continuously view and analyze the surrounding environment of the platform 1 for potential missile threats. During a military operation, the threat cueing sensor 12 is adapted to detect an initial flash from a stationary threat guidance system once a missile threat is launched from a stationary threat guidance system. Such data and information detected by the threat curing sensor 12 is relayed and sent to the other devices and components of the APS 10 to begin the initial step of deterring or jamming the missile threat. In the illustrated embodiment, the threat cueing sensor 12 may be an ultraviolet-visible-infrared camera used to detect missile threats from the surrounding environment of the platform 1.

Figure 1B:
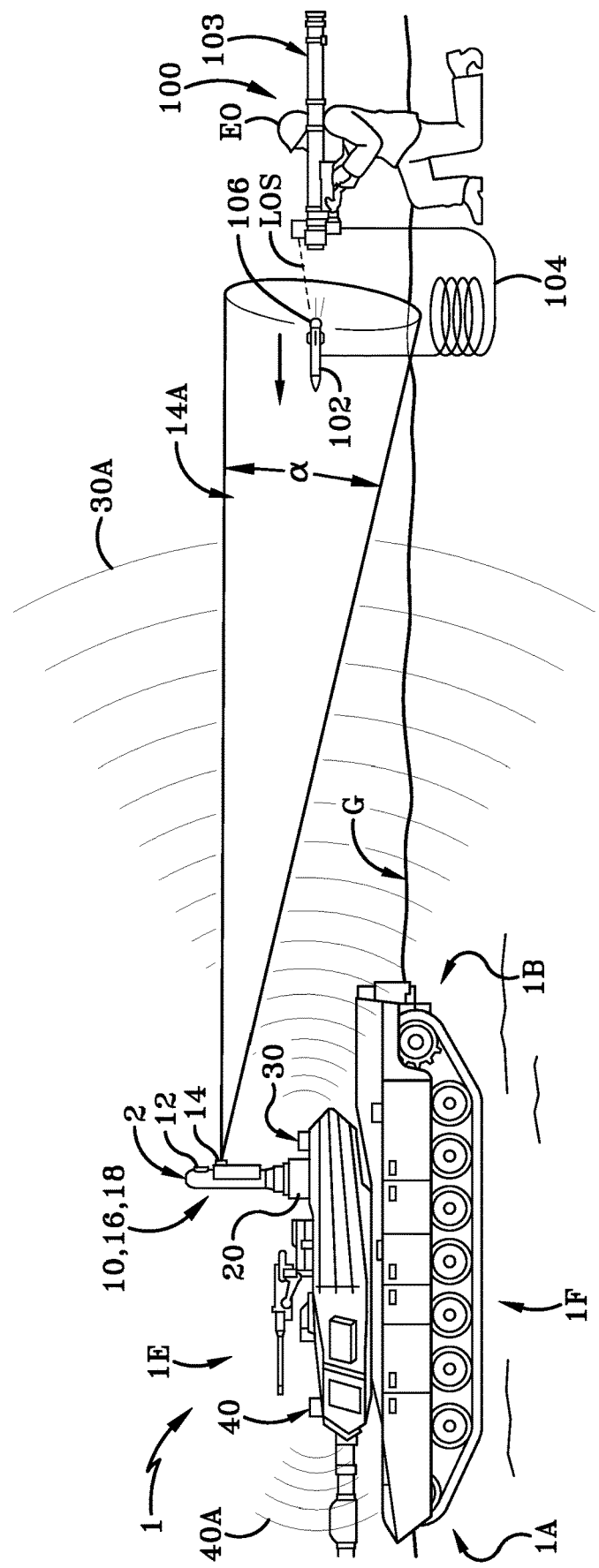
FIG. 1B (FIG. 1B) is a diagrammatic view similar to FIG. 1A, but a countermeasure beam is intersecting the line-of-sight between the missile threat and the threat guidance system via a logic system of the APS.
Figure 1C:
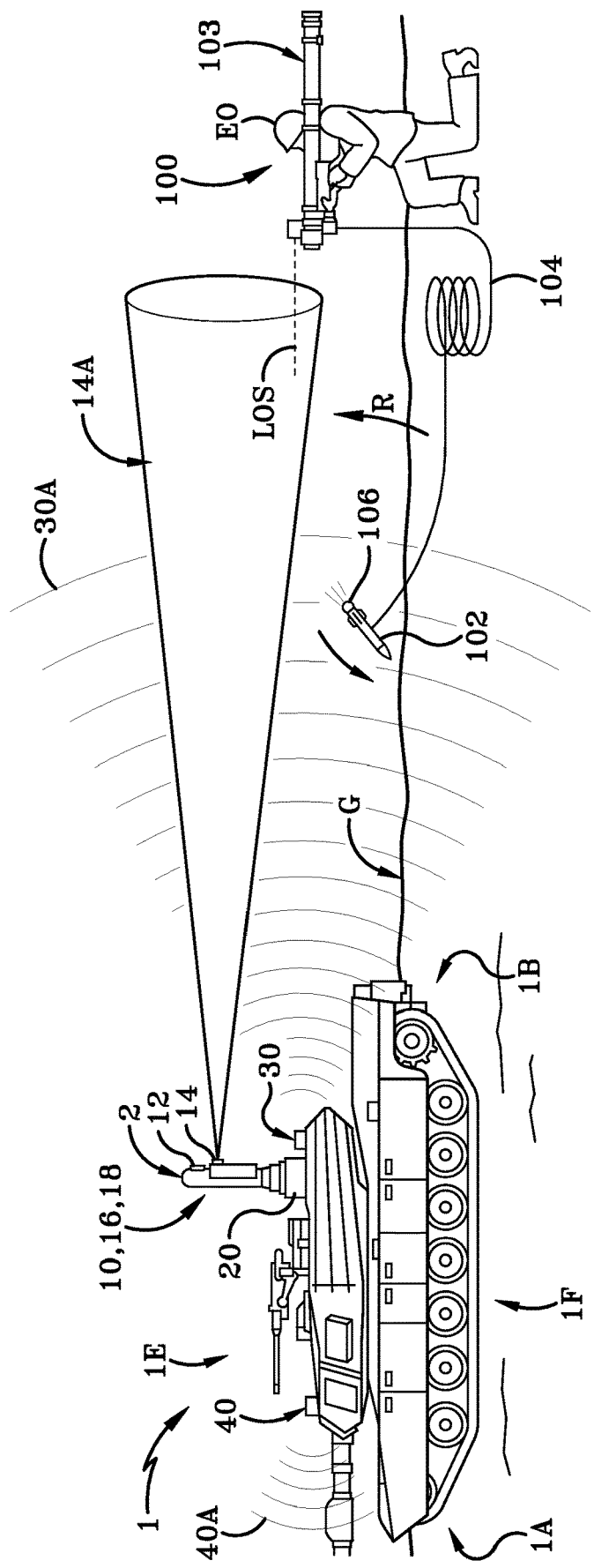
FIG. 1C (FIG. 1C) is a diagrammatic view similar to FIG. 1B, but the countermeasure beam is jamming the communication between the missile threat and the threat guidance system via the countermeasure beam to direct the missile threat away from the platform.
Figure 1D:
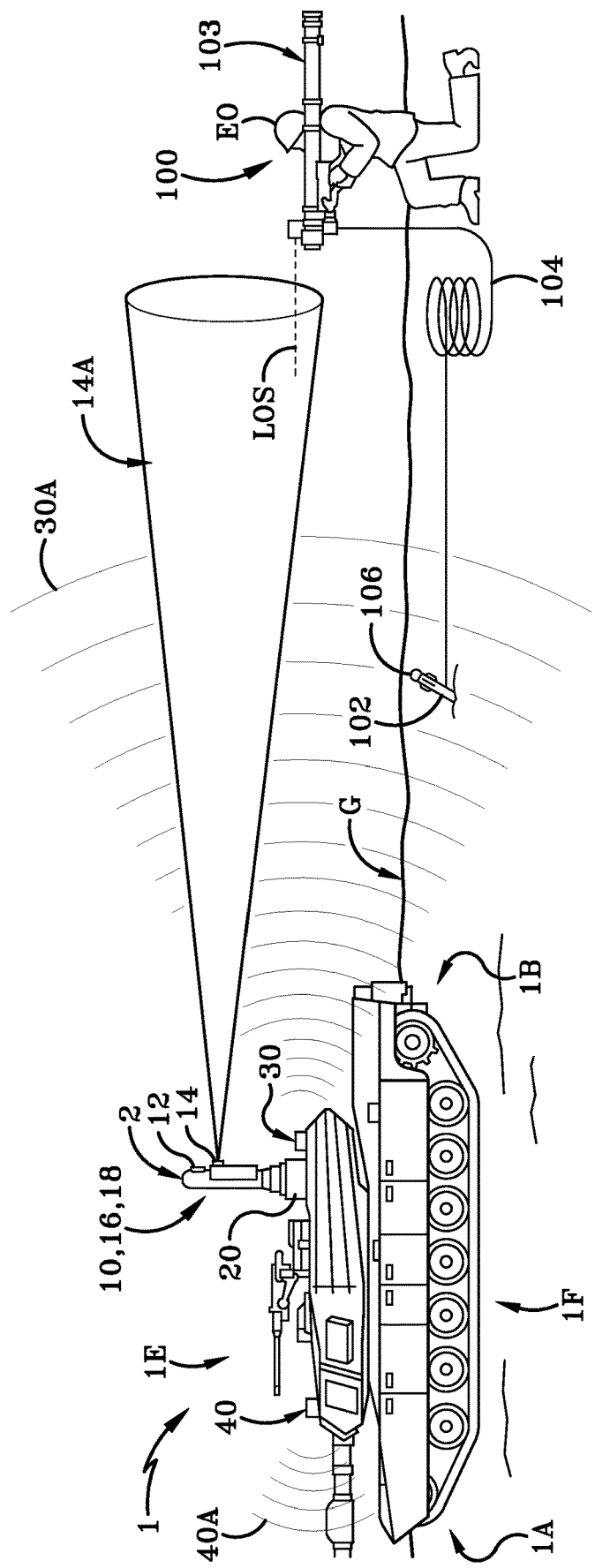
FIG. 1D (FIG. 1D) is a diagrammatic view similar to FIG. 1C, but the countermeasure beam is continually jamming the communication between the missile threat and the threat guidance system via the countermeasure beam to direct the missile threat away from the platform.

Referring to FIGS. 1B through 1D, the laser source 14 may be provided at a second position on the mast 2 remote from the first position of the threat cueing sensor 12. The laser source 14 is adapted to emit a countermeasure beam 14A approximately towards a threat guidance system, via the logic system 18, upon the threat cueing sensor 12 detecting an initial flash and/or launch of the missile threat. As described in more detail below, the countermeasure beam 14A emitted by the laser source 14 may be a "soft-kill APS" countermeasure to impair and/or jam the guidance communication between a missile threat and a threat guidance system. The countermeasure beam 14A emitted by the laser source 14 also defines a beam divergence with an angular measurement a. In one exemplary embodiment, a beam divergence of a countermeasure beam emitted by a laser source may between about 1 degree up to about 5 degrees. Such beam divergence of the countermeasure beam 14A is dependent upon the amount of wattage allotted to the APS 10 from the on-board electrical system of the platform 1. During a military operation, the laser source 14 may continuously emit the countermeasure beam 14A until the missile threat is deterred away from the platform 1 and is neutralized.

The INS 16 may be used during a military operation when the platform 1 moves orthogonally from a first, initial position to a second, translated position relative to a threat guidance system. Generally, the INS 16 is adapted to compensate for any rotation and translation of the platform 1 during a military operation when the platform 1 moves orthogonally from a first, initial position to a second, translated position relative to a threat guidance system. As such, the INS 16 is adapted to provide substantially instantaneous feedback to the APS 10 when the platform 1 performs any rotation and/or translation during a military operation measured from the initial position to the current translated position. The INS 16 that may be utilized with the APS 10 may include any suitable devices and/or components to compensate for any rotation and translation of the platform 1. Such devices and/or components provided in an INS may include computer motion sensors (e.g., accelerometers) and rotation sensors (e.g., gyroscopes), and other devices of the like. Such devices and/or components provided in the INS 16 allows the APS 10 to continuously determine the position, the orientation, and the direction and speed of movement (i.e., velocity) of the platform 1 without the need for external references.

In addition, the logic system 18 utilizes the data and information collected by the threat cueing sensor 12 and the INS 16 during a military operation of the platform 1. In the illustrated embodiment, the logic system 18 may logically command and/or instruct each of the threat cueing sensor 12, the laser sensor 14, and the adjustment mechanism 20, via a dynamic range estimation method, during a military operation in order to accurately and precisely jam a missile threat. In one instance, the logic system 18 may send a signal to the adjustment mechanism 20 to rotate the mast 2 about the vertical direction in a first direction based on an initial flash captured by the threat cueing sensor 12 after a missile threat was launched. In another instance, the logic system 18 may send a second signal to the laser source 14 to emit the countermeasure beam 14A. In the illustrated embodiment, the logic system 18 may position the countermeasure beam 14A emitted by the laser source 14 at a predetermined distance away from the platform 1. The predetermined distance of emitting the countermeasure beam 14A by the laser source 14 is described in more detail below.

In the illustrated embodiment, the adjustment mechanism 20 may be operably engaged to the mast 2 that houses the components and/or parts of the APS 10. As such, the adjustment mechanism 20 may operably rotate and/or move the APS 10 during a military operation. The adjustment mechanism 20 may be operably rotated and/or moved via a signal sent from the logic system 18. In one instance, the adjustment mechanism 20 may operably rotate or move the mast 2 to maintain the countermeasure beam 14A towards or near a threat guidance system, via the logic system 18, when the platform 1 is moving orthogonally from an initial position to a translated position relative to the threat guidance system. The adjustment mechanism 20 may also include any suitable components and/or parts to rotate the mast 2 and the APS 10. Such suitable components and/or parts for an adjusting mechanism may include a motor, a drive assembly that operably engages to the motor, and other suitable components and/or parts to rotate a mast and an APS on a platform.

In addition, the APS 10 may include additional components on the platform 1 to help supplement and increase the accuracy of positioning the countermeasure beam 14A proximate and/or near the actual location of a threat guidance system 1. Such additional components are described in more detail below.

As illustrated FIGS. 1A-1D, the platform 1 may include at least one acoustic sensor 30 emitting a signal wave 30A. In the illustrated embodiment, the platform 1 includes a single acoustic sensor 30 provided at the front end 1A of the platform 1. In other exemplary embodiments, a platform may include more than one acoustic sensor at any location on a platform to help supplement and increase the accuracy of positioning a countermeasure beam proximate and/or near the actual location of a threat guidance system. In the illustrated embodiment, the at least one acoustic sensor 30 is used to sense the acoustic pressure wave emitted at launch of an incoming missile threat. Generally, the at least one acoustic sensor 30 may be positioned linearly to one another on the platform 1 in addition to the APS 10. For ATGMs with an average velocity less than the speed of sound (approximately 340 meters/second), the APS 10 may assume that the threat guidance system location is at least 340 meters multiplied by an engagement elapsed time (seconds) distance away from the platform 1. With this, the APS 10 may achieve even longer dwell times when a missile threat is launched as compared to using the dynamic range estimation method by the logic system 18 in the absence of the at least one acoustic sensor 30. As such, the at least one acoustic sensor 30 provides additional information as to the actual location of a threat guidance system for adjusting the range estimation at a quicker rate via the logic system 18. Furthermore, the dynamic range estimation method used by the logic system 18 may remove noise from the surrounding environment in which the threat cueing sensor 12 dismisses during the launching of a missile threat.

Still referring to FIGS. 1A-1D, the platform 1 may include at least one temperature sensor 40 emitting a signal wave 40A. In the illustrated embodiment, the platform 1 includes a single temperature sensor 40 provided at the rear end 1B of the platform 1. In other exemplary embodiments, a platform may include more than one temperature sensor at any location on a platform to help supplement and increase the accuracy of positioning a countermeasure beam proximate and/or near the actual location of a threat guidance system. During a military operation, the at least one temperature sensor 40 may be utilized to compensate and/or alter the positioning of the countermeasure beam 14A relative to a threat guidance system based on the temperature reading surrounding the platform 1 from the missile threat. In other words, the APS 10 may realign or adjust the countermeasure beam 14A in a more accurate and/or precise location due to the temperature changes caused by the missile threat that is directed at the platform 1.

In exemplary embodiments, the APS 10 may use the at least one acoustic sensor 30 and the at least one temperature sensor 40 in any suitable manner. In one exemplary embodiment, an APS may utilize at least one acoustic sensor to help compensate the positioning of a countermeasure beam emitted by a laser source of the APS. In another exemplary embodiment, an APS may utilize at least one temperature sensor to help compensate the positioning of a countermeasure beam emitted by a laser source of the APS. In another exemplary embodiment, an APS may utilize at least one acoustic sensor and at least one temperature sensor to help compensate the positioning of a countermeasure beam emitted by a laser source of the APS

Having now described the parts and components of the APS 10, a method of using the APS 10 to deter and/or jam a missile threat during a military operation is provided below.

As described previously, the APS 10 may be operable with the platform 1 to greatly improve the deterrence and jamming of anti-tank guided missiles (or "ATGMs") such as semi-automatic command to line-of-sight "LOS" (or "SACLOS") missiles. SACLOSs are generally stationary threat guidance systems 100 positioned at a distance away from a platform, such as platform 1, during a military operation. As illustrated in FIG. 1A, the threat guidance system 100 is adapted to launch a missile threat 102 from a threat launcher 103 of the threat guidance system 100. The missile threat 102 is operably connected to the threat launcher 103 via a wire 104 which allows an enemy operator "EO" to operably control the flight path and trajectory of the missile threat 102 towards the platform 1. During launch, the enemy operator "EO" may track the missile threat 102 via an aft-facing beacon 106 positioned on the missile threat 102 to assist the enemy operator "EO" in guiding said missile threat 102 towards the platform 1 (see FIG. 16). As such, the aft-facing beacon 106 must be in the line-of-sight "LOS" of the threat guidance system 100 to accurately guide the missile threat 102 at the platform 1. As described in more detail below, the APS 10 greatly improves the deterrence and jamming of the threat guidance system 100 via a "soft-kill" countermeasure (i.e., countermeasure beam 14A emitted by laser source 14) in addition with a dynamic range estimation method used by the logic system 18.

During a military operation, the APS 10 may enable the threat cueing sensor 12 to continuously view the surrounding environment of the platform 1 for any missile threats launched from a threat guidance system. As illustrated in FIG. 1A, the at least one acoustic sensor 30 may also be enabled with the APS 10 during this military operation to continuously measure any acoustic pressure waves emitted at the launching of an incoming missile threat. Still referring to FIG. 1A, the at least one temperature sensor 40 may also be enabled with the APS 10 to continuously measure the temperature changes caused by the missile threat that is directed at the platform 1. As such, the threat cueing sensor 12 of the APS 10, the at least one acoustic sensor 30, and the at least one temperature sensor 40 may be continuously used during a military operation to continuously view or measure any and all incoming missile threats from the surrounding environment of the platform 1.

As illustrated in FIG. 1A, the threat cueing sensor 12 may detect a flash of light "F" from the threat guidance system 100 when a missile threat 102 is launched from the threat guidance system 100. The detection of the missile threat 102 being launched from the threat guidance system 100 is denoted by an arrow labeled 12A. The detection of the initial launch provides the bearing vector of the missile threat 102, which is also the bearing vector of the launcher 103 of the threat guidance system 100. It is assumed in this application of the APS 10 that the threat guidance system 100 is generally co-located with the threat launcher 103 during the launching of a missile threat 102. Once the bearing vector of the threat guidance system 100 is detected by the threat cueing sensor 12, the threat cueing sensor 12 may send a signal to the logic system 18 of the APS 10 detailing an accurate location of the threat guidance system 100 relative to the platform 1.

To support the threat cueing sensor 12 of the APS 10, the at least one acoustic sensor 30 may measure acoustic pressure waves emitted at the launch of the missile threat 102. As such, the at least one acoustic sensor 30 may send a signal to the logic system 18 of the APS 10 detailing the acoustic pressure waves emitted at the launch of the missile threat 102 to more accurately estimate the position of the threat guidance system 100. In addition, the at least one temperature sensor 40 may also be used to compensate the threat cueing sensor 12 of the APS 10 by measuring the temperature changes caused by the missile threat 102 directed at the platform 1. As such, the at least one temperature sensor 40 may send a signal to the logic system 18 of the APS 10 detailing the temperature changes caused by the missile threat 102 directed at the platform 1 to more accurately estimate the position of the threat guidance system 100. During a military operation, the at least one acoustic sensor 30 and the at least one temperature sensor 40 may continuously send data and information to help supplement the logic system 18 of the APS 10 when determining the actual location of the threat guidance system 100.

Once the logic system 18 receives data and information from the threat cueing sensor 12 regarding the bearing vector of the threat guidance system 100, the logic system 18 may then send a signal to the laser source 14 to emit the countermeasure beam 14A towards the initial launch location of the missile threat 102 detected by the threat cueing sensor 12. In addition, the logic system 18 may operably control the mast 2 to rotate in the direction towards the initial launch location of the missile threat 102 detected by the threat cueing sensor 12. If the platform 1 is moving from a first initial position to a second translated position parallel to the threat guidance system 100, the laser source 14 may accurately align the countermeasure beam 14A with the threat guidance system 100 due to the bearing vector of the threat guidance system 100 not changing (see FIG. 16). As shown in FIG. 1B, the countermeasure beam 14A of the laser source 14 has substantially intersected the line-of-sight "LOS" between the threat guidance system 100 and the missile threat 102. If, however, the platform 1 is moving from a first initial position to a second translated position orthogonal to the threat guidance system 100, dynamic estimations may be need to be determined by the logic system 18 to accurately align the countermeasure beam 14A with the threat guidance system 100 since the bearing vector of the threat guidance system 100 is changing during a military operation. Such dynamic estimations by the logic system 18 with the dynamic range estimation method is provided in more detail below.

Once the countermeasure beam 14A of the laser source 14 has intersected the line-of-sight "LOS" between the threat guidance system 100 and the missile threat 102, the APS 10 may disrupt and/or jam the guidance of the threat guidance system 100 to the missile threat 102. As illustrated in FIG. 1B, the countermeasure beam 14A may be substantially intersecting the line-of-sight "LOS" between the threat guidance system 100 and the missile threat 102. Due to this intersection, the countermeasure beam 14A may be able to interrupt and/or interfere with the threat guidance system 100 where the countermeasure beam 14A may act as the aft-facing beacon 106 of the missile threat 102. As such, the countermeasure beam 14A emitted by the laser source 14 may have a higher lumen measurement than that of the aft-facing beacon 106 of the missile threat 102 which may confuse and/or jam the threat guidance system 100 with the countermeasure beam 14A. Such jamming and/or countermeasuring occurs by the APS 10 because the countermeasure beam 14A emitted by the laser source 14 may be the only light source the threat guidance system 100 observes and/or detects due to the countermeasure beam 14A suppressing the light emitted by the aft-facing beacon 106 during flight of the missile threat 102. The countermeasure beam 14A may have a greater brightness than the aft-facing beacon 106 on the missile threat 102 when the missile threat 102 travels away from the threat guidance system 100 in later flight stages after launch. In order words, the countermeasure beam 14A remains at a constant brightness whereas the brightness of the aft-facing beacon 106 decreases as the missile threat 102 travels a greater distance away from the threat guidance system 100.

Since the APS 10 may be able to jam the communication between the threat guidance system 100 and the missile threat 102 by intersecting the line-of-sight "LOS" with the countermeasure beam 14A, the APS 10 may control and/or guide the missile threat 102 away from the platform 1. As illustrated in FIG. 1C, the logic system 18 may send a signal to the laser source 14 to pivot and rotate the countermeasure beam 14A slightly upwardly in order to neutralize the missile threat 102 by guiding the missile threat 102 into the ground. The pivot and/or rotation of the laser source 14 may be performed via the adjustment mechanism 20 operably engaged to the platform 1. Such pivot and/or rotation of the laser source 14 performed by the adjustment mechanism 20 is denoted by the arrow labeled "R." By maintaining or rotating to the countermeasure beam 14A while intersecting the line-of-sight "LOS" between the threat guidance system 100 and the missile threat 102, the threat guidance system 100 observes the countermeasure beam 14A as the aft-facing beacon 106 rather than the aft-facing beacon 106 itself. As such, the threat guidance system 100 mistakenly observes the missile threat 102 traveling upwardly and away from the platform 1 due to the positioning of the countermeasure beam 14A. With this, the threat guidance system 100 may then mistakenly guide the missile threat 102 downwardly given the countermeasure beam 14A remains at an elevated height (see FIG. 1C). Since the countermeasure beam 14A continuously intersects the line-of-sight "LOS" of the threat guidance system 100 and the missile threat 102, the threat guidance system 100 eventually guides the missile threat 102 into the ground thus detonating and neutralizing the threat to the platform 1 (see FIG. 1D).

While the APS 10 of the platform 1 may jam a threat guidance system 100 when traveling parallel to the threat guidance system 100, additional dynamic estimations may be used when the platform 1 is traveling orthogonally to the threat guidance system 100 from an initial position to a translated position relative to the threat guidance system 100. Such dynamic estimations are provided in more detail below.

Figure 2:
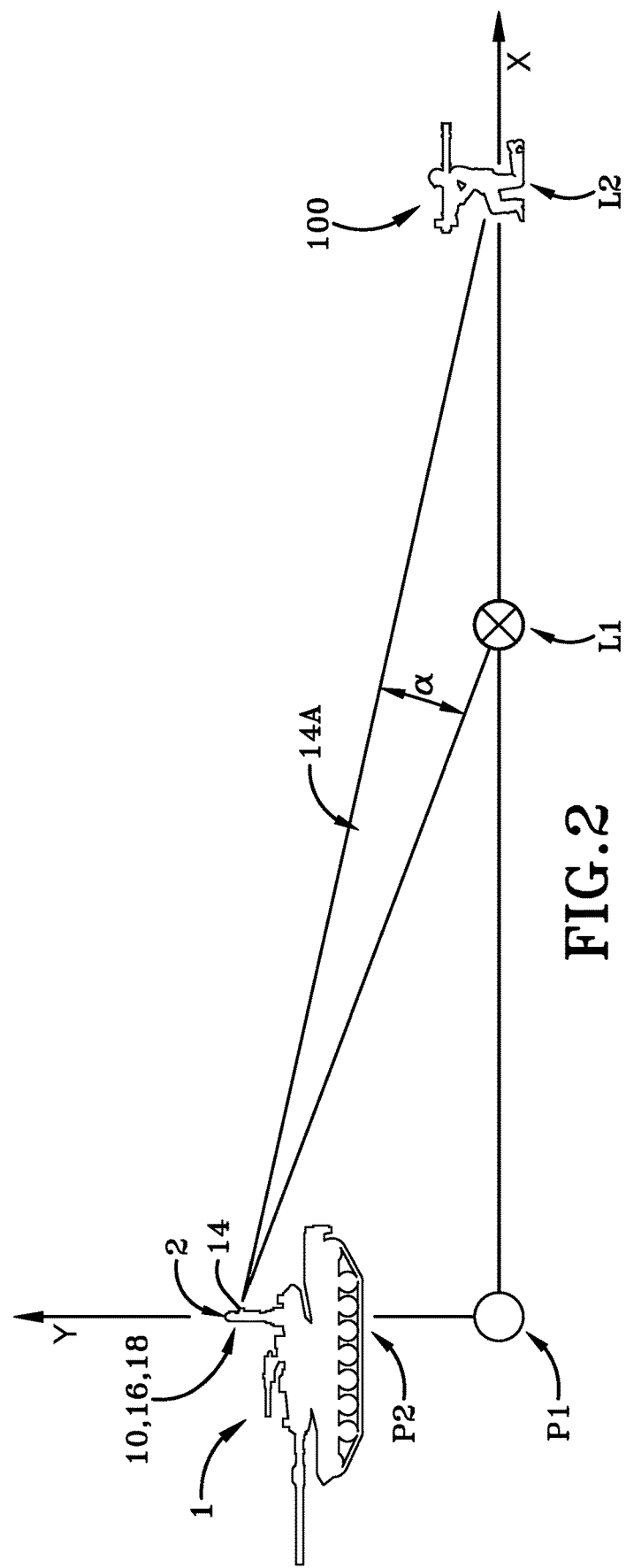
FIG. 2 (FIG. 2) is a diagrammatic view showing a beam divergence of the countermeasure beam emitted by the APS when the military platform is orthogonally moving away from the threat guidance system.

As illustrated in FIG. 2, the platform 1 is traveling from an initial position "P1" to a translated position "P2" orthogonal to the threat guidance system 100. While the APS 10 of the platform 1 is able to detect the bearing vector of the threat guidance system 100 via the threat cueing sensor 12, the APS 10 must compensate for rotation and/or translation of the platform 1 relative to the threat guidance system 100. To compensate for this rotation and/or translation, the INS 16 of the APS 10 may be able to provide substantially instantaneous feedback of both rotation and translation from the initial position "P1" of the platform 1 when the threat cueing sensor 12 detected the launch of the missile threat to the translated position "P2" of the platform. Such data and information gathered by the INS 16 during translation may be sent to the logic system 18 for dynamically providing an estimated position of the threat guidance system 100 during rotation and translation of the platform 1 (i.e., the logic system 18 using the dynamic range estimation method).

To compensate for inaccuracies of dynamically providing an estimated position of the threat guidance system 100 while the platform 1 is traveling orthogonally away from the threat guidance system 100, the countermeasure beam 14A emitted by the laser source 14 may have a beam divergence a that provides an angular measurement of the diameter of the countermeasure beam 14A (see above and FIG. 2). The beam divergence a of the countermeasure beam 14A allows for angular error (i.e., azimuth error) in order for the countermeasure beam 14A to intersect a portion of the line-of-sight "LOS" between the threat guidance system 100 and the missile threat 102 if the countermeasure beam 14A is not substantially aligned at the actual location of the threat guidance system 100. For example, if a countermeasure beam emitted from a laser source of an APS has a beam divergence of about 4 degrees, the angular error may be about 2 degrees between an estimated location "L1" of the threat guidance system 100 and an actual location "L2" of the threat guidance system 100 (see FIG. 2). Prior to military operation, the beam divergence a of the countermeasure beam 14A emitted by the laser source 14 is predetermined based on the amount of power the on-board electrical system of the platform 1 may provide to the APS 10.

Figure 3A:
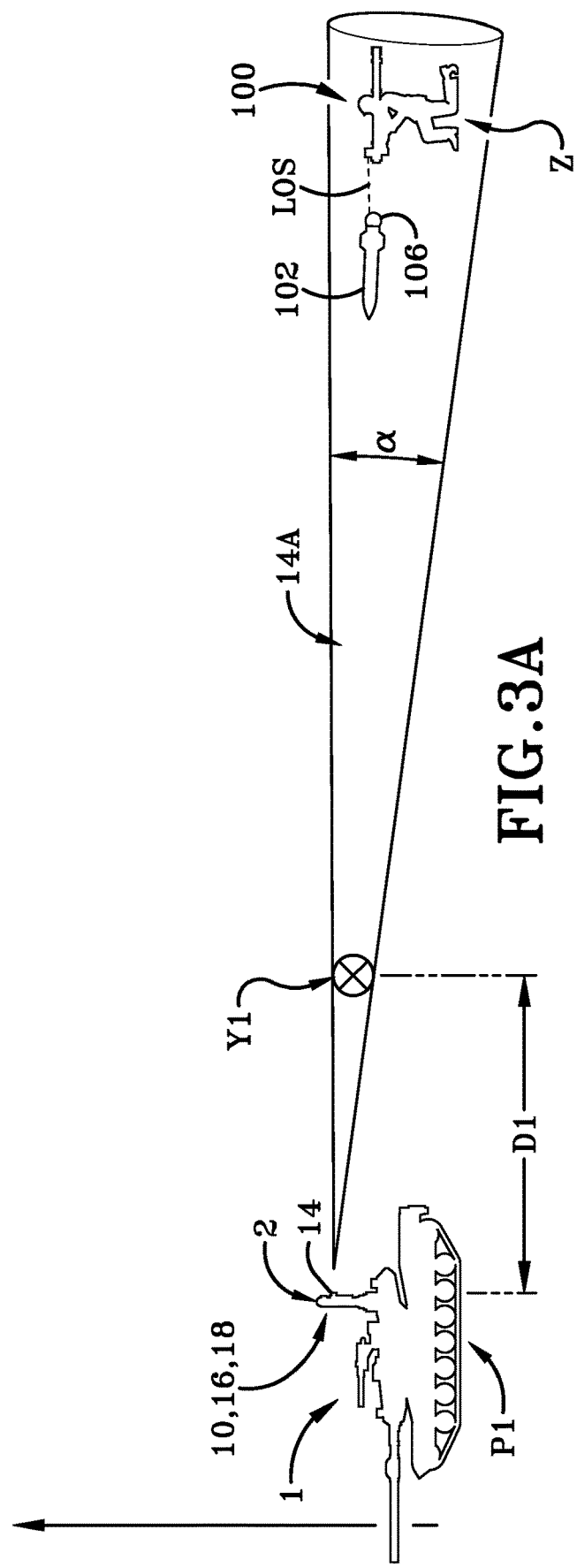
FIG. 3A (FIG. 3A) is a diagrammatic view showing a dynamic range estimation method, via the logic system, directing the countermeasure beam at a predetermined location upon initial launching of a missile threat from a long distance threat guidance system.
Figure 3B:
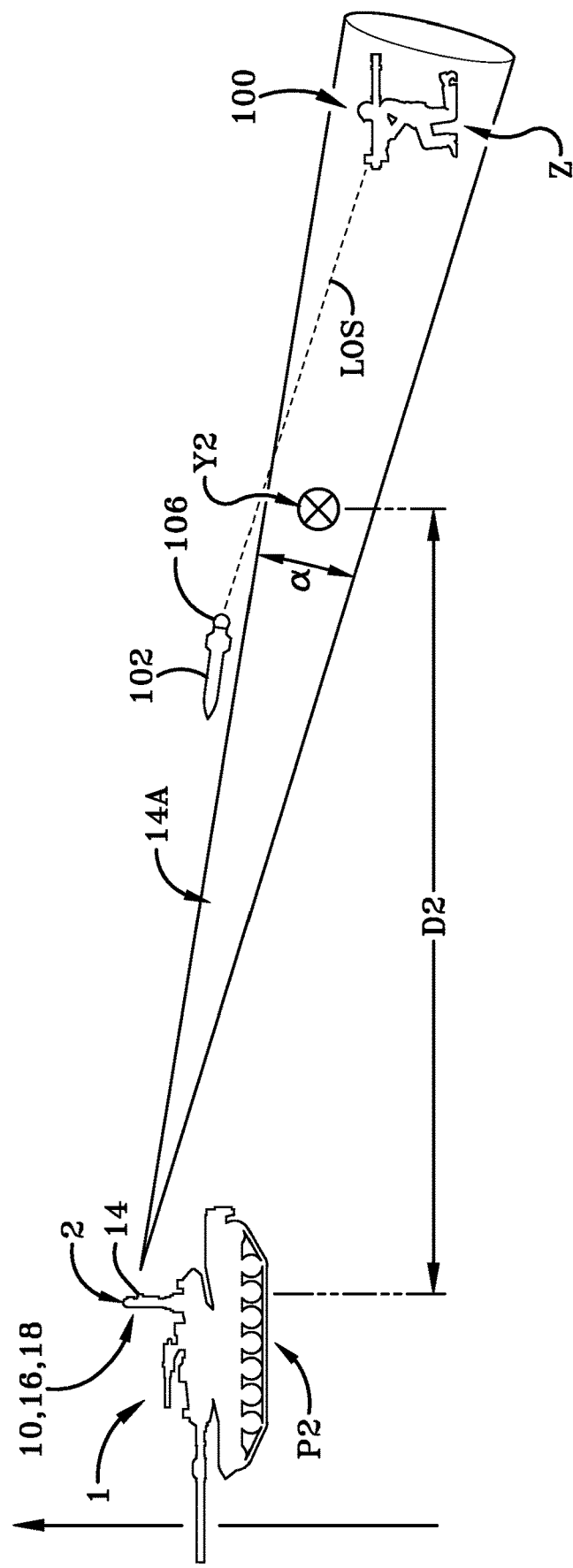
FIG. 3B (FIG. 3B) is a diagrammatic view similar to FIG. 3A, but the dynamic range estimation method, via the logic system, dynamically estimates the range of the threat guidance system by moving the countermeasure beam from the predetermined location to a first translated location closer to the threat guidance system.
Figure 3C:
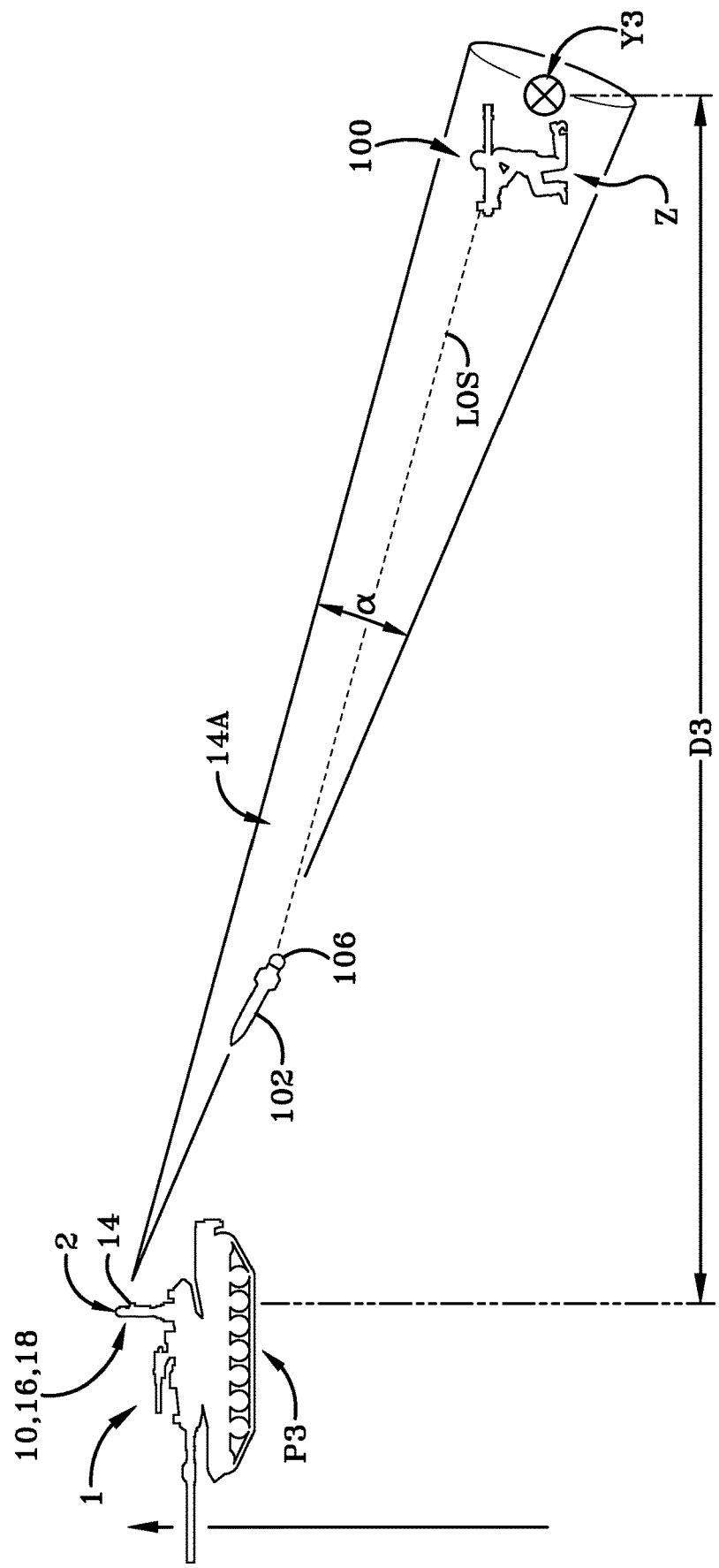
FIG. 3C (FIG. 3C) is a diagrammatic view similar to FIG. 3B, but the dynamic range estimation method, via the logic system, dynamically estimates the range of the threat guidance system from the first translated location to a second translated location closer to the threat guidance system.

As illustrated in FIGS. 3A-3C and FIGS. 4A-4C, the logic system 18 may include and use a dynamic range estimation method (as described above) when the threat guidance system 100 is located at a long distance (approximately 2 kilometers to about 4 kilometers). This dynamic range estimation method allows the APS 10 to dynamically adjust the countermeasure beam 14A from a predetermined target "Y1" towards the actual location "Z" of the threat guidance system 100 while the platform 1 rotates or translates away from the actual location "Z" of the threat guidance system 100. As described above, the threat cueing sensor 12 of the APS 10 initially detects the bearing vector of the missile threat 102 when launched from the threat guidance system 100. It is assumed that the bearing vector of the initially launched missile threat 102 is co-located with the bearing vector of the threat guidance system 100. With this information, the APS 10 has an accurate location of the threat guidance system 100 relative to the platform 1 at an initial location "P1". Once the bearing vector of the threat guidance system 100 is located, the logic system 18 sends a signal to the laser source 14 to emit the countermeasure beam 14A at the predetermined target "Y1". The predetermined target "Y1" is denoted by a cross-hair as shown in FIGS. 3A-3C. As illustrated in FIG. 3A, the predetermined target "Y1" is measured at a first distance "D1" from the platform 1. In addition, the logic system 18, via the dynamic range estimation method, instructs the laser source 14 to direct the countermeasure beam 14A at the predetermined target "Y1" whether or not the threat guidance system 100 is located at the predetermined target "Y1." In this stage of the military operation, the missile threat 102 is in an initial flight stage when the countermeasure beam 14A is directed at the predetermined target "Y1".

As illustrated in FIG. 3A, the APS 10 may be able to accurately direct the countermeasure beam 14A at the location of the threat guidance system 100 since the platform 1 is provided at the initial position "P1" where no rotation or translation of said platform 1 has occurred. As described above, the APS 10 is able to accurately direct the countermeasure beam 14A at the threat guidance system 100 when the platform is traveling or transitioning parallel to the threated guidance system 100 during a military operation.

As the platform 1 moves away from the initial position "P1" to a first translated position "P2", the logic system 18, via the dynamic range estimation method, dynamically adjusts the countermeasure beam 14A to move closer to the threat guidance system 100 at a first translated target "Y2". As illustrated in FIG. 3B, the first translated target "Y2" is measured at a second distance "D2" from the platform 1, which is greater than the first distance "D1" of the predetermined target "Y1" described above. The first translated target "Y2" is also disposed between the platform 1 and the target guiding system 100 due to the dynamic adjustment of the APS 10. In addition, the logic system 18, via the dynamic range estimation method, instructs the laser source 14 to direct the countermeasure beam 14A at the first translated target "Y2" whether or not the threat guidance system 100 is located at the first translated target "Y2." In this stage of the military operation, the missile threat 102 is in a mid-flight stage when the countermeasure beam 14A is translated from the predetermined target "Y1" to the first translated target "Y2". While comparing the predetermined target "Y1" and the first translated target "Y2", the logic system 18, via the dynamic range estimation method, is able to dynamically adjust the countermeasure beam 14A more accurately towards the location of the threat guidance system 100 when the missile threat 102 travels from the initial flight stage (FIG. 3A) to the mid-flight stage (FIG. 36). In addition, the INS 16 may assist the logic system 18 in more accurately pointing the countermeasure beam 14A near the threat guidance system 100 based on the INS 16 tracking and gathering movement and velocity of the platform 1 during this military operation.

As illustrated in FIG. 3B, the APS 10 may be able to accurately direct the countermeasure beam 14A at the location of the threat guidance system 100 while moving away from the initial position "P1" to the first translated position "P2" where rotation and/or translation of said platform 1 has occurred. In the illustrated embodiment, the countermeasure beam 14A may still intersect the line-of-sight "LOS" between the missile threat 102 and the threat guidance system 100 when the countermeasure beam 14A is directed at the first translated target "Y2" and the missile threat 102 is in mid-flight. Such intersection by the countermeasure beam 14A jams and/or inhibits guidance by the threat guidance system 100 to the missile threat 102 due to the countermeasure beam 14A having a greater brightness than the aft-facing beacon 106 on the missile threat 102 when the missile threat 102 travels away from the threat guidance system 100 in the mid-fight stage. In order words, the countermeasure beam 14A remains at a constant brightness whereas the brightness of the aft-facing beacon 106 decreases as the missile threat 102 travels a greater distance away from the threat guidance system 100.

As the platform 1 moves away from the first translated position "P2" to a second translated position "P3", the logic system 18, via the dynamic range estimation method, dynamically adjusts the countermeasure beam 14A to move closer to the threat guidance system 100 at a second translated target "Y3". As illustrated in FIG. 3C, the second translated target "Y3" is measured at a third distance "D3" from the platform 1, which is greater than the second distance "D2" of the first translated target "Y2" as described above. The second translated target "Y3" is also disposed proximate to the threat guidance system 100 and remote from the platform 1 due to the dynamic adjustment of the APS 10. In addition, the logic system 18, via the dynamic range estimation method, instructs the laser source 14 to direct the countermeasure beam 14A at the second translated target "P3" whether or not the threat guidance system 100 is located at the first translated target "P2." In this stage of the military operation, the missile threat 102 is in a late-flight stage when the countermeasure beam 14A is translated from the first translated target "Y2" to the second translated target "Y3". While comparing the first translated target "Y2" to the second translated target "Y3", the logic system 18, via the dynamic range estimation method, is able to dynamically adjust the countermeasure beam 14A more accurately towards the location of the threat guidance system 100 when the missile threat 102 travels from the mid-flight stage (FIG. 3B) to the late-flight stage (FIG. 3C). In addition, the INS 16 may again assist the logic system 18 in more accurately pointing the countermeasure beam 14A near the threat guidance system 100 based on the INS 16 tracking and gathering movement and velocity of the platform 1 during this military operation.

As illustrated in FIG. 3C, the APS 10 may be able to accurately direct the countermeasure beam 14A at the location of the threat guidance system 100 while moving away from the first translated position "P2" to the second translated position "P3" where rotation and/or translation of said platform 1 has occurred. In the illustrated embodiment, the countermeasure beam 14A may substantially intersect the line-of-sight "LOS" between the missile threat 102 and the threat guidance system 100 when the countermeasure beam 14A is directed at the second translated target "Y3" and the missile threat 102 is in late-flight. Such intersection by the countermeasure beam 14A jams and/or inhibits guidance by the threat guidance system 100 to the missile threat 102 due to the countermeasure beam 14A having a greater brightness than the aft-facing beacon 106 on the missile threat 102.

During this military operation, the logic system 18 utilizing the dynamic range estimation method is most effective during mid-flight and late-flight stages of the missile threat 102. Generally, the APS 10 is more effective during these stages because the missile threat 102 has been in flight for a greater amount of time allowing the APS 10 to dynamically adjust the countermeasure beam 14A towards the actual location of the threat guidance system 100 when the platform 1 is rotating and/or translating away from the threat guidance system 100. During mid-flight and late-flight stages, the countermeasure beam 14A has a higher probability of jamming the communication between the missile threat 102 and the threat guidance system 100 due to the beam divergence of the countermeasure beam 14A covering the line-of-sight "LOS" between the missile threat 102 and the threat guiding missile 100.

The use of the dynamic range estimation method in FIGS. 3A-3C is considered advantageous at least because the dynamic range estimation method allows for a greater amount of time to adjust the countermeasure beam 14A when a threat guidance system 100 is at a long range (e.g., a range from about 2 kilometers up to about 4 kilometers). As illustrated in FIGS. 3A through 3C, the countermeasure beam 14A is pointed at a predetermined location, such as predetermined location "Y1", proximate to the platform 1 in order to allow the APS 10 to dynamically adjust the countermeasure beam 14A upon detection of the missile threat 102. As such, the predetermined positioning of the countermeasure beam 14A closer to the platform 1 allows for greater error and adjustment while the missile threat 102 is in flight allowing for greater dwell time. By having a suitable beam divergence a defined by the countermeasure beam 14A, the APS 10 is able to have a greater error of directing the countermeasure beam 14A at the threat guidance system 100 during a military operation.

Figure 4A:
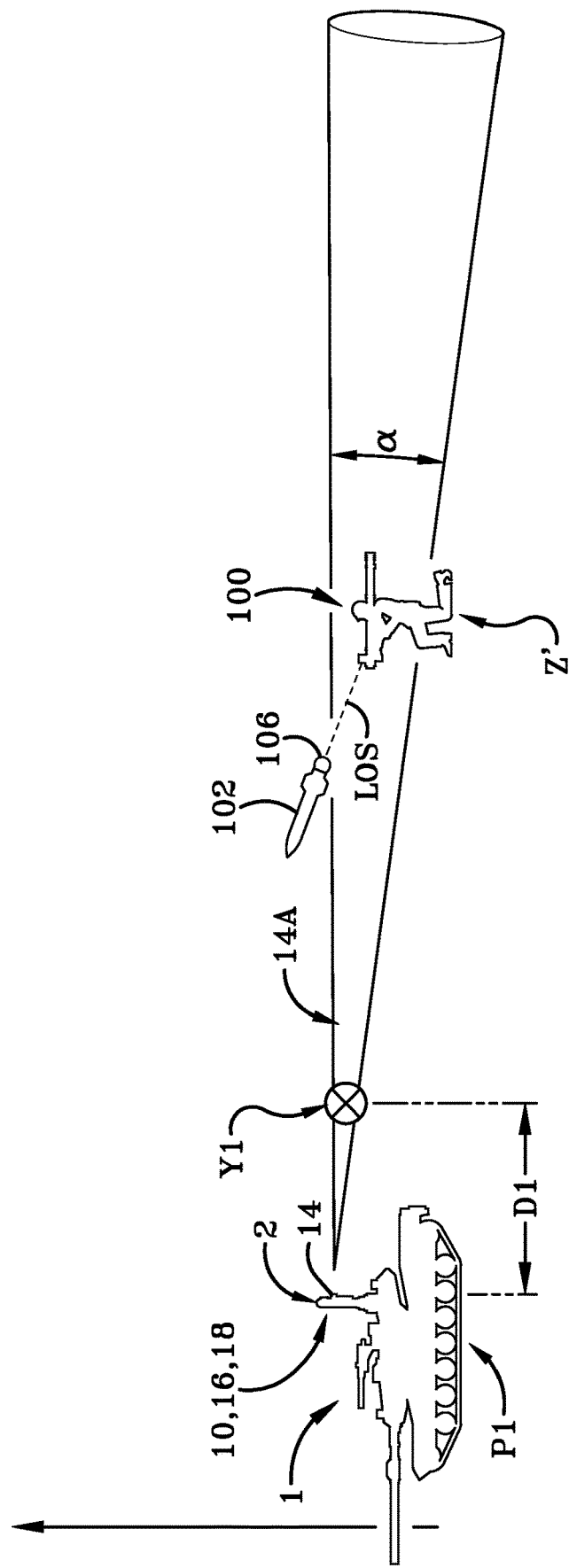
FIG. 4A (FIG. 4A) is a diagrammatic view showing the dynamic range estimation method, via the logic system, directing the countermeasure beam at a predetermined location upon initial launching of a missile threat from a short distance threat guidance system.
Figure 4B:
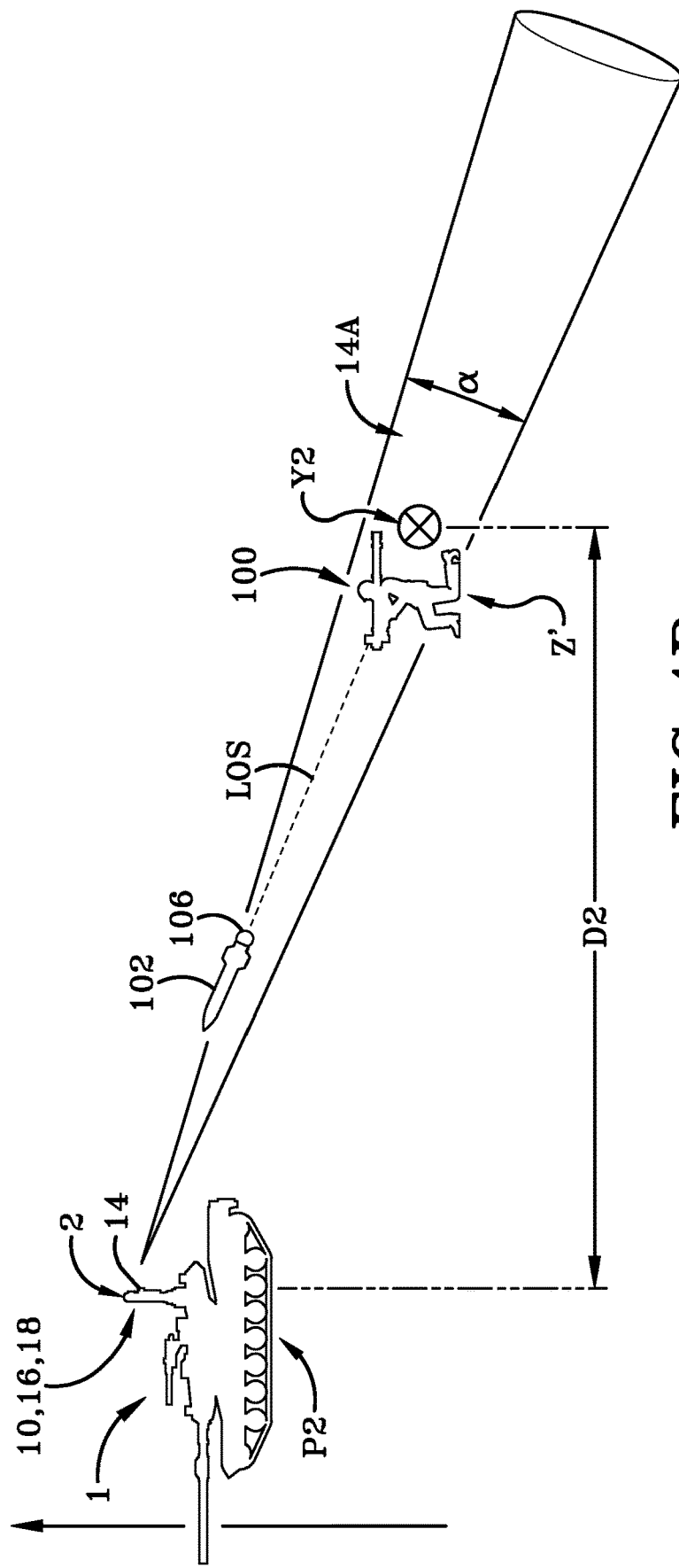
FIG. 4B (FIG. 4B) is a diagrammatic view similar to FIG. 4A, but the dynamic range estimation method, via the logic system, dynamically estimates the range of the threat guidance system by moving the countermeasure beam from the predetermined location to a first translated location closer to the threat guidance system.

While the dynamic range estimation method of the APS 10 is effective at jamming threat guidance systems at longer ranges (FIGS. 3A-3C), the dynamic range estimation method of the APS 10 may be effective at jamming threat guidance systems at shorter ranges. As illustrated in FIGS. 4A-4C, the threat guidance system 100 may be positioned at a different location "Z" that is closer to the platform 1 as described previously and illustrated in FIGS. 3A-3C. In one exemplary embodiment, the range between a platform and a threat guidance system may be about 600 meters up to about 2 kilometers.

In this shorter range, the APS 10 may still use the predetermined location "Y1" for pointing the countermeasure beam 14A once a missile threat 102 is detected at an initial position "P1" of the platform 1 (see FIG. 4A). The APS 10, along with the dynamic range estimation method, may dynamically adjust countermeasure beam 14A from the predetermined location "Y1" towards the location "Z" of the threat guidance system 100 as detected by threat cueing sensor 12 (see FIGS. 4B and 4C). In this illustrated embodiment, the APS 10 is able to dynamically adjust the countermeasure beam 14A into the line-of-sight "LOS" between the missile threat 102 and the threat guidance system 100. However, the amount of time to dynamically adjust the countermeasure beam 14A to jam the communication between the missile threat 102 and the threat guidance system 100 is less than the amount of time when the threat guidance system was provided at a longer distance as illustrated in FIGS. 3A-3C. In other words, the dwell time provided in this situation illustrated in FIGS. 4A-4C is less than the dwell time provided in situation illustrated in FIGS. 3A-3C.

As such, the jamming provided by the APS 10 in FIGS. 4A-4C may be most effective when the countermeasure beam 14A is dynamically adjusted from the predetermined location "Y1" to a first translated location "Y2" during the early to mid-flight stages of the missile threat 102. As the APS 10 dynamically adjusts the countermeasure beam 14A from the first translated location "Y2" to a second translated location "Y3", the missile threat 102 may be within the hard-kill zone such that the soft-kill provided by the APS 10 may no longer be feasible for deterring and/or jamming the threat guidance system 100.

Figure 5:
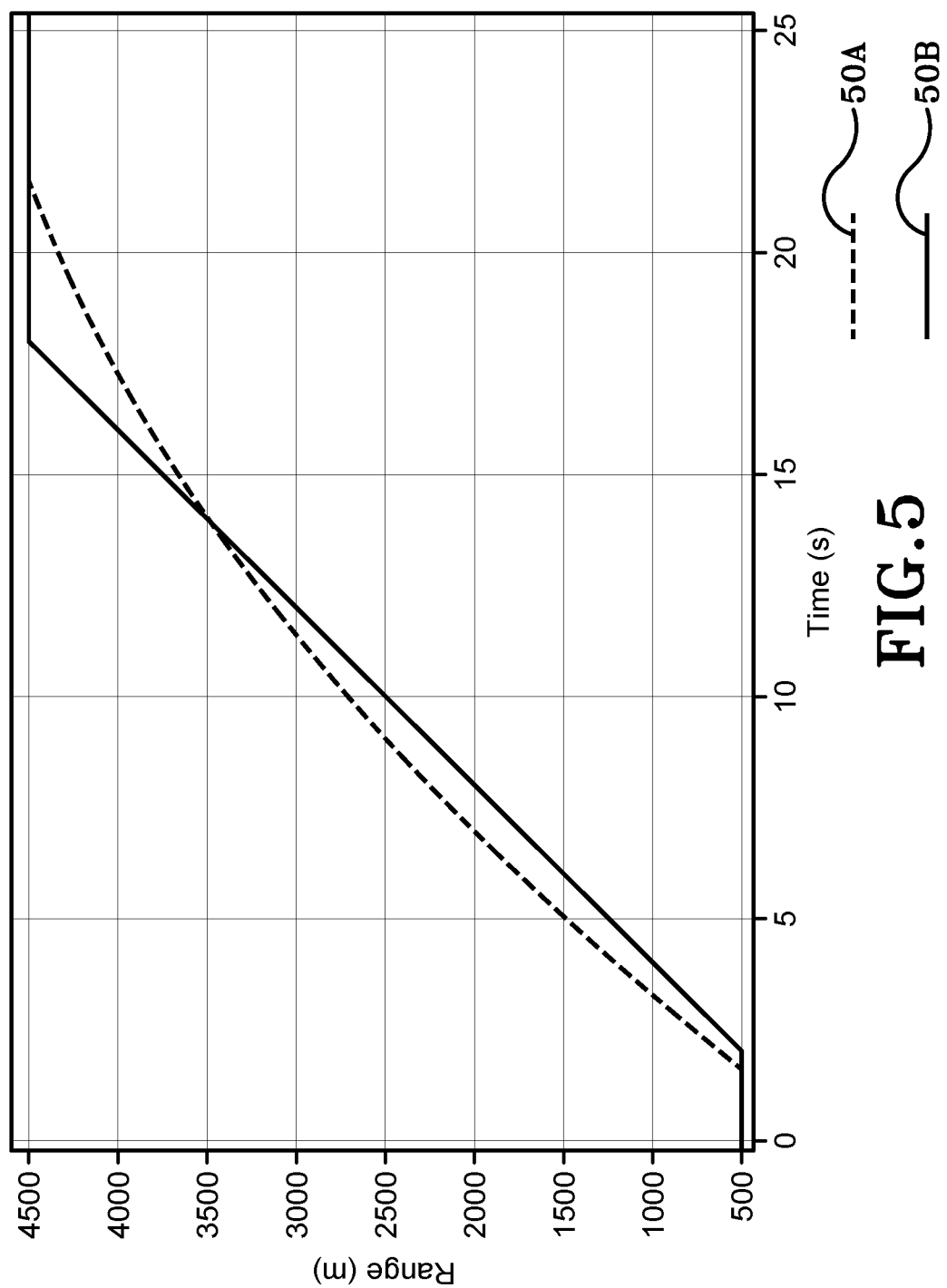
FIG. 5 (FIG. 5) is an exemplary graphical illustrations showing logical methods for dynamically estimating a range of a threat guidance system.

The dynamic range estimation method used by the logic system 18 may use a nonlinear range estimation 50A or a linear range estimation 50B when dynamically adjusting the countermeasure beam 14A from a predetermined location towards an actual location of the threat guidance system 100 as detected by the threat cueing sensor 12. The APS 10 may dynamically adjust the countermeasure beam 14A based on the speed of the platform, the divergence angle of the countermeasure beam, and the range error between the estimated location of the threat guidance system and the actual location of the threat guidance system. As illustrated in FIG. 5, the nonlinear range estimation 50A may use the following equation:

$$\text{Range} = xt - x/60t^2 \quad \text{Equation 1:}$$

where x is the distance (in meters) that the threat guidance system 100 is located relative to the platform 1 multiplied by the missile threat 102 engagement elapsed time t (in seconds) at a distance away from the platform 1. This portion of the equation is subtracted from distance (in meters) that the threat guidance system 100 is located relative to the platform 1 multiplied by the missile threat 102 engagement elapsed time (in seconds) at a distance away from the platform 1. Still referring to FIG. 5, the linear range estimation 50B may use the following equation:

$$\text{Range} = xt \quad \text{Equation 2:}$$

where x is the distance (in meters) that the threat guidance system 100 is located relative to the platform 1 multiplied by missile threat 102 engagement elapsed time t (in seconds) at a distance away from the platform 1.

Both the nonlinear range estimation 50A and the linear range estimation 50B are considered advantageous at least because both range estimations 50A, 50B are improvements over a static range estimate (i.e., setting a predetermined range in the APS without any additional adjustments during operation, see FIG. 1A-1D). In the illustrated embodiment, the non-linear function may provide more beneficial results over the linear function since the non-linear function provides more dwell time in which the APS 10 may dynamically adjust the countermeasure beam 14A and jam the communication between a missile threat and a threat guidance system. As such, the non-linear estimation allows the APS 10 to dynamically adjust the countermeasure beam 14A from a predetermined location to an accurate estimated location of a threat guidance system a greater speed in the early stage of flight and slows down in speed at greater distances. The non-linear function may also be beneficial for close range situations due to the APS 10 dynamically adjusting the countermeasure beam 14A at a higher rate.

Furthermore, the at least one acoustic sensor 30 and the at least one temperature sensor 40 may be supplemented with the APS 10 when the platform 1 is moving orthogonally to the threat guidance system 100 (functionality of the sensors 30, 40 are described in more detail above). In other words, the data and information received by the at least one acoustic sensor 30 and the at least one temperature sensor 40 allows the APS 10 to more accurately augment and estimate the location of the threat guidance system 100 with these devices when the platform 1 is rotating or translating relative to the threat guidance system 100. In one example, the data collected by the at least one acoustic sensor 30 may be included into either the non-linear range estimation or linear range estimation to augment the accuracy of the APS 10. In another example, the data collected by the at least one temperature sensor 40 may also be included into either the non-linear range estimation or linear range estimation to augment the accuracy of the APS 10.

Figure 6:
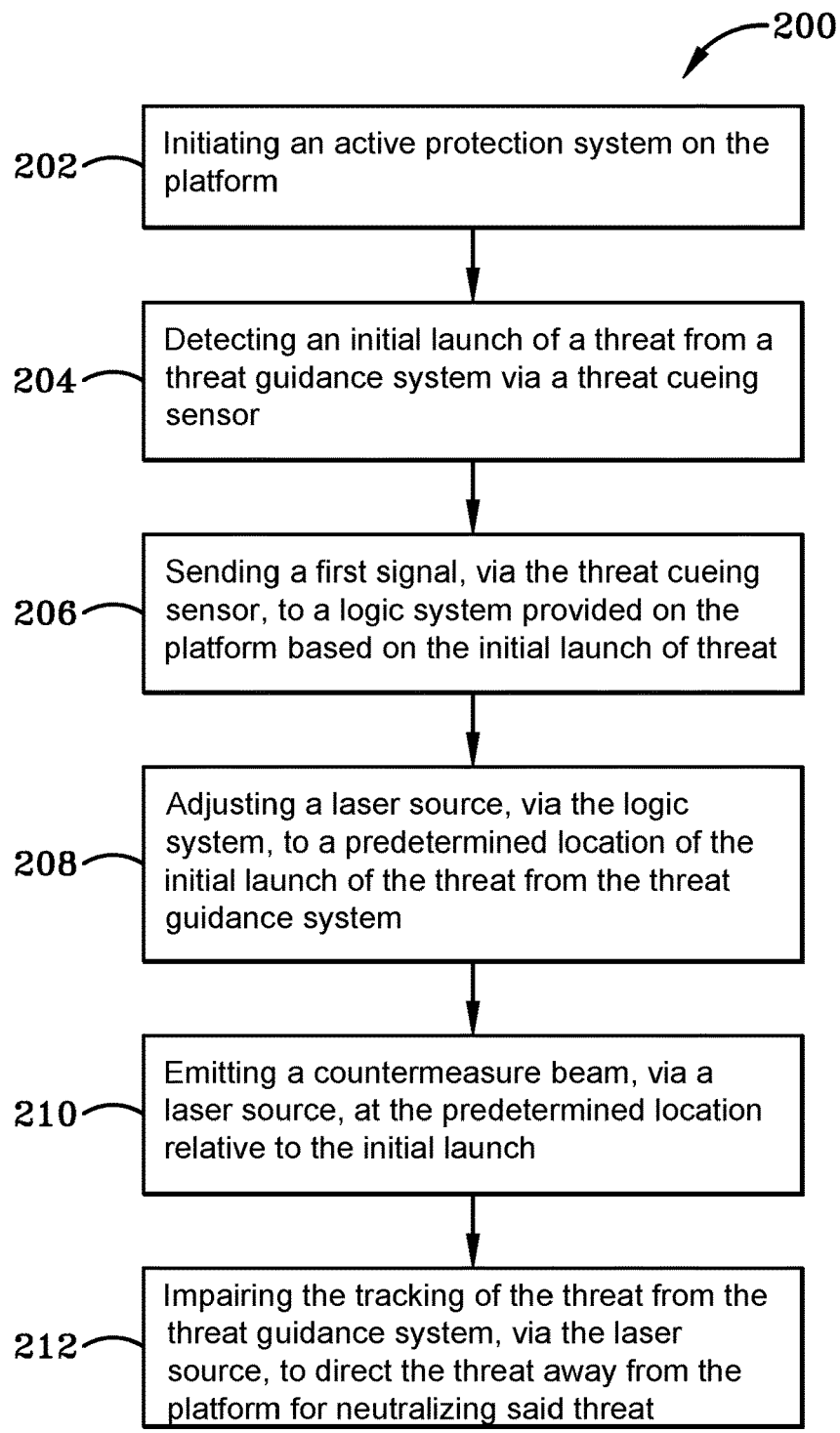
FIG. 6 (FIG. 6) is an exemplary method flowchart for diverting a threat away from a platform.

FIG. 6 illustrates a method 200 for diverting a missile threat. An initial step 202 of the method 200 comprises initiating an active protection system on the platform. Another step 204 comprises detecting an initial launch of a threat from a threat guidance system via a threat cueing sensor. Another step 206 comprises sending a first signal, via the threat cueing sensor, to a logic system provided on the platform based on the initial launch of the threat. Another step 208 comprises adjusting a laser source, via the logic system, to a predetermined location of the initial launch of the threat from the threat guidance system. Another step 210 comprises emitting a countermeasure beam, via a laser source, at the predetermined location relative to the initial launch. Another step 212 comprises impairing the tracking of the threat from the threat guidance system, via the laser source, to direct the threat away from the platform for neutralizing said threat.

In an exemplary embodiment, method 200 may include additional steps for neutralizing a missile threat. Optional steps may include analyzing a bearing vector of the threat, via the threat cueing sensor, when the threat is launched from the threat guidance system relative to the platform; and determining the bearing of the threat guidance system, via the threat cueing sensor, based on the bearing vector of the threat. Another optional step may include directing countermeasure beam at an optical sight of the threat guidance system to impair to ability of tracking the threat from said threat guidance system. Another optional step may include directing the countermeasure beam at a predetermined location, via the logic system, at a distance between the platform and the threat guidance system. Another optional step may include adjusting the countermeasure beam, via an inertial navigation system, based on rotation or translation of the platform from an initial position to a translated position. Another optional step may include dynamically estimating the actual location of the threat guidance system, via the logic system, when the platform moves orthogonally from the initial position to the translated position relative to the threat guidance system. Another optional step may include correcting the countermeasure beam, via the logic system, from the predetermined location towards the estimated location of the threat guidance system when the platform moves orthogonally from the initial position to the translated position relative to the threat guidance system. Another set of optional steps may include analyzing the acoustic pressure wave emitted from a threat when launched from the threat guidance system via at least one acoustic sensor, and augmenting the accuracy of the logic system. Another optional step may include analyzing the temperature changes due to the speed of sound of a threat launched from the threat guidance system via at least one temperature sensor, and augmenting the accuracy of the logic system.

While the APS 10 has been described and illustrated herein for protecting a military platform, the APS 10 may be operably engaged and/or connected to other commercial platforms for protecting such platform from an enemy missile and/or threat. Examples of suitable commercial platforms that may use an APS as described and illustrated herein include commercial buildings and/or structures, commercial communication structures, commercial oil platform or offshore platform, commercial vehicles, commercial vessels, commercial aircrafts, and other suitable commercial platforms of the like.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. An active protection system for a platform, comprising:
    a threat cueing sensor provided at a first position on the platform, wherein the threat cueing sensor detects a threat launched from a threat guidance system at a distance away from the platform;
    a logic system operably connected to the threat cueing sensor, wherein the logic system is adapted to determine an estimated location of the threat guidance system via a distance away from the platform;
    a laser source operably connected to the logic system, wherein the laser source emits a countermeasure beam directed at the estimated location of the threat guidance system to deter the threat away from the platform; and
    an inertial navigation system operably connected to the logic system, the inertial navigation system is adapted to provide substantially instantaneous feedback of the rotation and the translation of the platform from an initial position to a translated position.

2. The active protection system of claim 1, wherein the threat cueing sensor is adapted to analyze a bearing vector of the threat when launched from the threat guidance system relative to the platform to provide a bearing of the threat guidance system.

3. The active protection system of claim 1, wherein the countermeasure beam is adapted to be directed at an optical sight of the threat guidance system to impair tracking of the threat from said threat guidance system.

4. The active protection system of claim 1, wherein the logic system dynamically estimates the location of the threat guidance system from a predetermined point between the platform and the threat guidance system when the platform rotates or translates from the initial position to the translated position.

5. The active protection system of claim 1, further comprising:
    at least one acoustic sensor operably connected to the logic system, wherein the at least one acoustic sensor is adapted to analyze the acoustic pressure wave emitted from the threat when launched from the threat guidance system, and wherein the at least one acoustic sensor is adapted to augment the accuracy of the logic system.

6. The active protection system of claim 1, further comprising:
    at least one temperature sensor operably connected to the logic system, wherein the at least one temperature sensor is adapted to analyze the temperature changes created by the speed of sound of the threat launched from the threat guidance system, and wherein the at least one temperature sensor is adapted to augment the accuracy of the logic system.

7. A method for diverting a threat away from a platform, comprising:
    initiating an active protection system on the platform
    detecting an initial launch of a threat from a threat guidance system via a threat cueing sensor;
    sending a first signal, via the threat cueing sensor, to a logic system based on the initial launch of the threat;
    adjusting a laser source, via the logic system, to a predetermined location of the initial launch of the threat from the threat guidance system;

emitting a countermeasure beam, via a laser source, at the predetermined location relative to the initial launch;

directing the countermeasure beam at a predetermined location, via the logic system, at a distance between the platform and the threat guidance system;

adjusting the countermeasure beam, via an inertial navigation system, based on rotation or translation of the platform from an initial position to a translated position;

impairing the tracking of the threat from the threat guidance system, via the laser source, to direct the threat away from the platform for neutralizing said threat.

8. The method of claim 7, further comprising:

analyzing a bearing vector of the threat, via the threat cueing sensor, when the threat is launched from the threat guidance system relative to the platform; and determining a bearing of the threat guidance system, via the threat cueing sensor, based on the bearing vector of the threat.

9. The method of claim 8, further comprising:

directing the countermeasure beam at an optical sight of the threat guidance system to impair to ability of tracking the threat from said threat guidance system.

10. The method of claim 7, further comprising:

dynamically estimating an actual location of the threat guidance system, via the logic system, when the platform moves orthogonally from the initial position to the translated position relative to the threat guidance system.

11. The method of claim 10, further comprising:

correcting the countermeasure beam, via the logic system, from the predetermined location towards an estimated location of the threat guidance system when the platform moves orthogonally from the initial position to the translated position relative to the threat guidance system.

12. The method of claim 7, further comprising:

analyzing the acoustic pressure wave emitted from a threat when launched from the threat guidance system via at least one acoustic sensor; and augmenting the accuracy of the logic system.

13. The method of claim 7, further comprising:

analyzing the temperature changes due to the speed of sound of a threat launched from the threat guidance system via at least one temperature sensor; and augmenting the accuracy of the logic system.

14. A system, comprising:

a platform; and an active protection system operably engaged with the platform, the active protection system comprising:

a threat cueing sensor provided at a first position on the platform, wherein the threat cueing sensor detects a threat launched from a threat guidance system at a distance away from the platform;

a logic system operably connected to the threat cueing sensor, wherein the logic system is adapted to determine an estimated location of the threat guidance system via a distance away from the platform, wherein the Iodic system dynamically estimates the location of the threat guidance system from a predetermined point between the platform and the threat guidance system when the platform rotates or translates from the initial position to the translated position; and a laser source operably connected to the logic system, wherein the laser source emits a countermeasure beam directed at the estimated location of the threat guidance system to deter the threat away from the platform.

15. The system of claim 14, further comprising:

at least one acoustic sensor operably connected to the logic system, wherein the at least one acoustic sensor is adapted to analyze the acoustic pressure wave emitted from the threat when launched from the threat guidance system, and wherein the at least one acoustic sensor is adapted to augment the accuracy of the logic system.

16. The system of claim 14, further comprising:

at least one temperature sensor operably connected to the logic system, wherein the at least one temperature sensor is adapted to analyze the temperature changes created by the speed of sound of the threat launched from the threat guidance system, and wherein the at least one temperature sensor is adapted to augment the accuracy of the logic system.

* * * * *